United States Patent [19]

Saito et al.

[11] Patent Number: 4,898,370
[45] Date of Patent: Feb. 6, 1990

[54] CLAMPING APPARATUS

[75] Inventors: Masayuki Saito; Yasuo Kazama, both of Tokyo, Japan

[73] Assignee: Nitto Kohki Co., Ltd., Tokyo, Japan

[21] Appl. No.: 279,765

[22] Filed: Dec. 5, 1988

[30] Foreign Application Priority Data

Dec. 11, 1987 [JP] Japan .................. 62-188683

[51] Int. Cl.4 .............................. B25B 1/10
[52] U.S. Cl. ..................................... 269/91
[58] Field of Search .................... 269/91–94, 269/246, 99; 411/13

[56] References Cited

U.S. PATENT DOCUMENTS 3,222,053 12/1965 Severdia .................. 269/91
3,987,699 10/1976 Popenoe .................. 411/13
4,265,434 5/1981 Hamilton et al. .
4,304,399 12/1981 Szugda .................... 269/93
4,771,999 9/1988 Takeuchi et al. .......... 269/285

FOREIGN PATENT DOCUMENTS 464523 1/1914 France ..................... 269/91
379885 7/1964 Switzerland ............... 269/93
495193 8/1968 Switzerland .
1284494 8/1972 United Kingdom .

Primary Examiner—Robert C. Watson
Attorney, Agent, or Firm—Nixon & Vanderhye

[57] ABSTRACT

A clamping apparatus comprises a base block to be mounted on the top surface of a bed, a cylindrical clamp base having a male screw on the outer peripheral surface thereof and mounted on the base block for up-and-down motion, a clamp piece threadedly fitted on the male screw of the clamp base and adapted to press an object of clamping on the bed, and a lift mechanism for moving the clamp piece and the clamp base up and down, with respect to the base block.

3 Claims, 2 Drawing Sheets

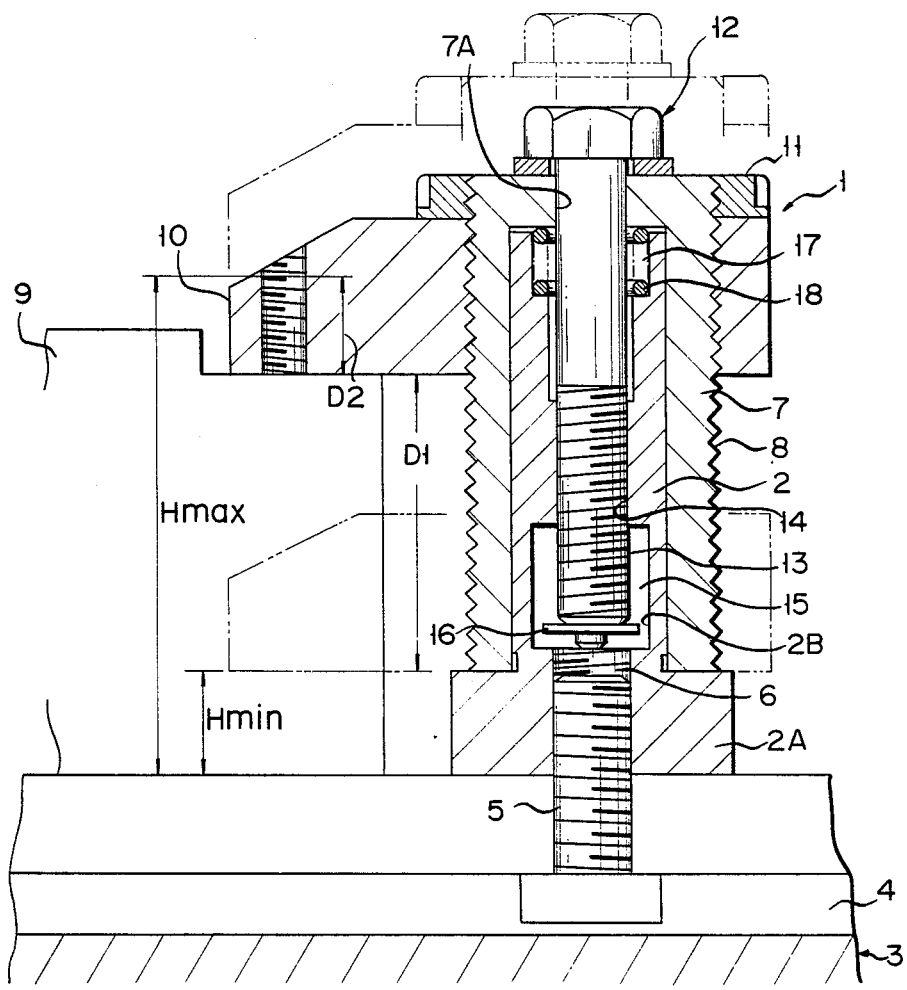
F I G. 1

CLAMPING APPARATUS

BACKGROUND OF THE INVENTION

1. Field of the Invention

The present invention relates to a clamping apparatus for fixing a workpiece or other object of clamping to a bed under pressure, and more particularly, to a clamping apparatus capable of clamping any objects of clamping with different heights and permitting easy setting and removal of the object.

2. Description of the Related Art

In conventional clamping apparatuses which fix a workpiece to a bed of a machine tool by utilizing the clamping force of screws, a clamp piece is stretched over the workpiece and a base block placed on the bed, and a clamp bolt is located penetrating the intermediate portion of the clamp piece. A tip screw portion of the clamp bolt is connected to a T-nut or the like, which is fitted in a T-groove of the bed, whereby the workpiece is fixed to the bed.

In order to apply one such clamping apparatus to various workpieces with different heights, it is necessary to provide base blocks of different sizes corresponding to the heights of the workpieces. Without the use of the various base blocks for the individual cases, the clamp piece tilts, so that a horizontal force acts thereon as a pressure screw is tightened. Accordingly, the clamp piece may slip on the workpiece, or otherwise, the workpiece may slip on the bed. Thus, the workpiece cannot be stably fixed under pressure. If the pressure screw is loosened for the replacement of the workpiece, moreover, the clamp piece can be easily disengaged from the base block. The setting of a new workpiece, therefore, requires repetition of the aforementioned operation.

Meanwhile, some of these clamping apparatuses are improved in the applicability to workpieces with various heights and in the efficiency of replacement of workpieces. Among these conventional apparatuses, there are ones which have a hydraulic-cylinder structure such that a clamp piece is fixed to the tip end of a piston rod, and a male screw to mate with a female screw on the bed is formed on the outer peripheral surface of a cylinder tube. These clamping apparatuses must, however, be provided with means for threadedly fitting the cylinder tube into the female screw of the bed and means for adjusting the depth of threaded engagement in accordance with the height of the workpiece. These apparatuses can be applied only to those beds which have a female screw with an inside diameter large enough to mate with the male screw on the outer peripheral surface of the cylinder tube.

The clamping apparatuses of the conventional construction utilize the clamping force of the clamp bolt which penetrates the clamp piece stretched over the workpiece and the base block. These apparatuses are poor in the applicability to workpieces with various heights and in the efficiency of replacement of workpieces. In the clamping apparatuses of the hydraulic-cylinder construction, with the male screw on the outer peripheral surface of the cylinder tube, moreover, the male screw serves both as means for connecting the apparatus to the bed and as means for adjusting the level of the clamp piece. Accordingly, the clamping apparatuses of this type can be used only with those beds which have a female screw with an inside diameter large enough to mate with the aforesaid male screw.

SUMMARY OF THE INVENTION

The object of the present invention is to provide a clamping apparatus which can be applied to objects of clamping with various heights, permits easy replacement of the objects, and can be mounted on beds of various constructions.

The above object of the present invention is achieved by a clamping apparatus constructed as follows. The apparatus comprises a base block to be mounted on the top surface of a bed, a cylindrical clamp base having a male screw on the outer peripheral surface thereof and mounted on the base block for up-and-down motion, a clamp piece threadedly fitted on the male screw of the clamp base and adapted to press an object of clamping on the bed, and a lift mechanism for moving the clamp piece and the clamp base up and down, with respect to the base block.

According to the clamping apparatus of the present invention, the base block is fixed to the bed by the use of suitable means, and the clamp piece is rotated in line with the height of the object of clamping, so that the vertical position of the threaded engagement with the clamp base is initially set. Meanwhile, the object is placed under the clamp piece, and the lift mechanism is then operated to press down the clamp piece and the clamp base, with respect to the base block, thereby fixing the object to the bed. The object of clamping can be replaced with a new one by only moving the clamp piece in one with the clamp base, in the opposite direction, by means of the lift mechanism. In this case, the new object is placed under the clamp piece, having been returned to the position near the initially set position, and the clamp base is pressed down again in one with the clamp piece, by means of the lift mechanism.

According to the clamping apparatus of the present invention, moreover, the level of the clamp piece can be changed within the range in which the piece is raised or lowered together with the clamp base by means of the lift mechanism. Also, the level of the clamp piece can be independently adjusted within a range such that it can move in engagement with the clamp base. Thus, the clamping apparatus of the invention can be directly applied to objects with various heights.

Once the position of the clamp piece, in threaded engagement with the clamp base, is adjusted to the height of the object of clamping, the object can be easily replaced with a new one by only raising or lowering the clamp piece in one with the clamp base, without readjusting the position of the clamp piece with every replacement.

Moreover, the male screw for the engagement between the clamp piece and the clamp base does not double as means for fixing the base block to the bed. Therefore, means for fixing the clamping apparatus of the invention to the bed can be applied to beds of various constructions, which may be provided with a T-groove or female screw.

BRIEF DESCRIPTION OF THE DRAWINGS

FIG. 1 is a longitudinal sectional view of a clamping apparatus according to an embodiment of the present invention.

DETAILED DESCRIPTION OF THE PREFERRED EMBODIMENT

Figure 2:
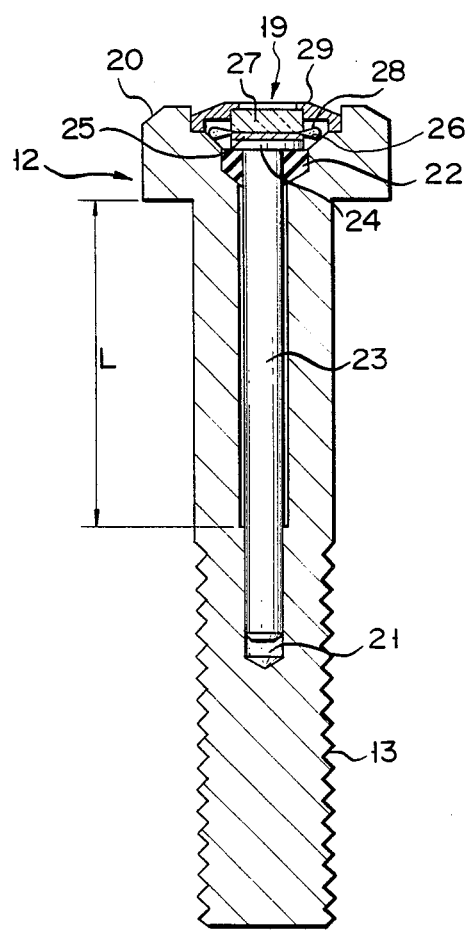
FIG. 2 is a longitudinal sectional view showing a modification of a clamping bolt shown in FIG. 1.

In an embodiment of the present invention shown in FIG. 1, clamping apparatus 1 comprises stepped cylindrical base block 2 which has flange portion 2A at its lower part. Flange portion 2A is formed with female screw 6. Block 2 can be coupled to bed 3 of a machine tool in a manner such that T-bolt 5, which is loosely fitted, for example, in T-groove 4 of bed 3 and protrudes upward therefrom, is threadedly fitted in screw 6.

Cylindrical clamp base 7 is fitted on the outer peripheral surface of base block 2 for up-and-down motion, and male screw 8 is formed on the whole outer peripheral surface of base 7. Clamp piece 10 for pressing down workpiece 9 on bed 3 is rotatably fitted on screw 8. Piece 10, which can be situated at a desired level within the range of distance D1, in accordance with the amount of its rotation around clamp base 7, is located at a position above the top of workpiece 9, depending on the height of the workpiece. After the level of clamp piece 10 is set, lock nut 11 for retaining piece 10 is threadedly fitted onto male screw 8. Alternatively, nut 11 may be located under piece 10.

In clamping workpiece 9, in the present embodiment, clamp piece 10 on clamp base 7 is moved up and down, with respect to base block 2, by means of clamp bolt 12. More specifically, bolt 12 is inserted into through hole 7A of base 7 from above, and male screw portion 13 of bolt 12 is screwed into intermediate female screw portion 14 of stepped axial hole 2B bored through block 2. Stopper 16 is fixed to the tip end of clamp bolt 12 which projects from the lower end of female screw portion 14 into intermediate large-diameter portion of axial hole 2B. Compression coil spring 18, which serves to urge clamp base 7 resiliently upward, is previously housed in top opening portion 17 of hole 2B of base block 2.

If clamp bolt 12 is rotated in its loosening direction, e.g., counterclockwise direction, to be raised from the position of FIG. 1, clamp base 7, which is subjected to the resilient force of compression coil spring 18, rises together with bolt 12, thereby separating clamp piece 10 from workpiece 9. If clamp bolt 12 is rotated in the opposite direction or clockwise direction, clamp base 7 lowers against the resilient force of spring 18, thereby causing piece 10 to press workpiece 9 against bed 3. The upper motion limit of bolt 12 is defined as stopper 16 abuts against the bottom surface of intermediate large-diameter portion 15. Accordingly, the range of the up-and-down motion of clamp base 7, relative to base block 2, corresponds to distance D2. Thus, clamp piece 10 can ascend and descend integrally with base 7 within the range of distance D2, and can also move independently of base 7 for distance D1. In consequence, piece 10 can clamp workpiece 9 whose height ranges from minimum height Hmin to maximum height Hmax. The effective length of male screw portion 13 of clamp bolt 12, which engages base block 2, is constant.

Clamp bolt 12 may be a mere hexagon-head bolt. Alternatively, it may be provided with indicating mechanism 19 through which the fixed state of workpiece 9 can be visually detected, on the basis of the amount of elastic deformation of bolt 12 which ma be caused when the workpiece is fixed by means of clamp piece 10. In this case, rod 23 is inserted into axial hole 21, which extends from top portion 20 of bolt 12, against the resilient force of rubber ring 22 for use as an elastic member attached to the opening portion, as shown in FIG. 2.

Top head 24 of rod 23 is provided with reflective indicator 25 with a coat or mark of a relatively loud color, e.g., red or yellow. Transparent member 27, formed of glass or the like, is located facing the surface of indicator 25 across light absorbing fluid 26, deep-blue or black in color. Fluid 26 can be previously packed in flexible transparent pouch 28. Rod 23 is pressed by means of transparent member 27, against the resilient force of rubber ring 22, so that fluid 26 is removed from between member 27 and indicator 25. In this state, transparent member 27 is fixed to the opening portion of axial hole 21 of clamp bolt 12 by crimping ring holder 29, and the tip end portion of rod 23 is fixed to a blind end portion of hole 21 by bonding. When this elastic deformation indicating mechanism 19 is in its initial state, top head 24 of rod 23 uniformly presses transparent member 27, thereby thoroughly driving out light absorbing fluid 26 from between head 24 and member 27 to the region around transparent pouch 28. Thus, indicator 25 on the surface of head 24 can be clearly seen through transparent member 27.

Before clamp bolt 12, starting from its initial state, attains a predetermined stress strain state, top head 24 of rod 23 presses transparent member 27, thereby transferring light absorbing fluid 26 at the pressed region to the surrounding region of pouch 28 and holding it thereat. Thus, indicator 25 on the top end face of rod 23 can bee seen through member 27. When bolt 12 attains a predetermined tensile strain state, transparent member 27 is separated from head 24 by the strain. Accordingly, fluid 26 flows from the surrounding region of pouch 28 into the space between member 27 and head 24 so as to cover indicator 25. Thereupon, the color of indicator 25, as seen through transparent member 27, is suddenly changed into a dark one. The predetermined stress strain state of clamp bolt 12 can be noticed by such a change of state of indicator 25.

The change of state (change of color) of indicator 25, which can be seen through transparent member 27, is reversibly repeated with every elastic deformation of clamp bolt 12. The stress strain of bolt 12, caused when indicator 25 becomes seeable through member 27, depends on length L, cross-sectional area, and modulus of elasticity of a region which is substantially elongated when a tightening torque is applied to bolt 12. Thus, these characteristic values are set in accordance with the tightening torque produced when workpiece 9 is fully pressed and fixed by means of clamp piece 10.

In clamp bolt 12 constructed in this manner, the indicated strain is based on the elastic deformation of the region designated by symbol L in FIG. 2. It is not advisable, therefore, to form a screw at that region, so that the effective length of the screw, as measured from the tip end face of bolt 12, is shorter than the overall length of the bolt. In this embodiment, clamp piece 10 not only can ascend and descend following clamp bolt 12, but also can be independently adjusted to a desired level relative to clamp base 7. Thus, the apparatus can be applied to various workpieces with different heights.

The following is a description of the operation of the clamping apparatus according to the present embodiment.

In fixing workpiece 9 to bed 3 by means of clamping apparatus 1 of this embodiment, base block 2 is first fixed to a desired position on bed 3 by means of T-bolt 5 which is loosely fitted in T-groove 4 of bed 3.

Then, the level of clamp piece 10 is initially set so that workpiece 9 can be located under the clamp piece. If the height of workpiece 9 is not less than minimum height Hmin and is less than the sum of height Hmin and distance D1, piece 10 on clamp base 7 is rotated to adjust its bottom surface to a level above the top surface of the workpiece. If the height of workpiece 9 is not less than the sum of minimum height Hmin and distance D1 and is not more than maximum height Hmax, clamp piece 10 is rotated to be adjusted to the maximum level, as shown in FIG. 1. Further, clamp bolt 12 is rotated in the ascending direction so that clamp base 7 is raised integrally with piece 10 by the resilient force of compression coil spring 18. Thus, the bottom surface of clamp piece 10 is adjusted to the level above the top surface of workpiece 9. Thereafter, workpiece 9 is placed under clamp piece 10, and clamp bolt 12 is rotated in the tightening direction, thereby pressing down piece 10 together with clamp base 7. Thus, workpiece 9 is fixed to bed 3 under pressure by means of clamp piece 10. The clamp bolt used in this embodiment is constructed so that it can indicate the stress strain state for itself. Accordingly, a proper tightening torque can be determined in accordance with the change of state of indicator 25 which can be seen through transparent member 27.

In removing workpiece 9, clamp bolt 12 is rotated in the loosening direction to be raised. Thereupon, clamp base 7, which is subjected to the resilient force of compression coil spring 18, rises together with bolt 12, thereby separating clamp piece 10 from workpiece 9. In this state, workpiece 9 is replaced with a new one, and the new workpiece is placed under piece 10. Thereafter, piece 10 can be pressed down together with clamp base 7 by only rotating bolt 12 in the tightening direction again. Thus, clamp piece 10 presses and fixes workpiece 9 to bed 3.

It is to be understood that the present invention is not limited to the embodiment described above, and that various changes and modifications may be effected therein by one skilled in the art without departing from the scope or spirit of the invention.

For example, in the embodiment described above, clamp base 7 is raised together with clamp bolt 12 by means of the resilient force of compression coil spring 18. Alternatively, however, a stop ring for retention may be fitted on clamp bolt 12, which is rotatably inserted in through hole 7A of base 7, so that base 7 is held by means of bolt 12.

The lift mechanism for raising and lowering clamp base 7 relatively to base block 2 is not limited to the arrangement described in connection with the above embodiment, which utilizes the clamping force of clamp bolt 12. Alternatively, oil pressure may be utilized for this purpose. In this case, the base block constitutes a cylinder tube, and it is necessary only that a piston rod protruding from a piston, which is inserted in the cylinder tube, be fixed to the clamp base.

The means for coupling the base block to the bed is not limited to the arrangement in which the T-bolt is loosely fitted in the T-groove of the bed. In an alternative arrangement, the base block is fixed to the bed in a manner such that a T-nut is screwed on a bolt which protrudes from the bottom surface of the base block. Alternatively, moreover, a building block may be disposed between the bed and the base block so that the whole clamping apparatus is fixed in an upwardly shifted position.

The clamping apparatus of the present invention may be applied not only to the case in which a workpiece is fixed to the bed of a machine tool, but also to a case such that a molding die is fixed to a bed of an injection-molding machine.

What is claimed is:

1. A clamping apparatus comprising:
   a base block to be mounted on the top surface of the bed;
   a cylindrical clamp base having a male screw on the outer peripheral surface thereof and mounted on the base block for up-and-down motion;
   a clamp piece threadedly fitted on the male screw of the clamp base and adapted to press an object of clamping on the bed; and
   lift means for moving the clamp piece and the clamp base up and down, with respect to the base block, said clamp base having a through hole at a top portion thereof, and said lift means including a bolt threadedly fitted in a female screw of the base block through the through hole of the clamp base, spring means arranged between the base block and clamp base for urging the clamp base upward, and stopper means fixed to the tip end of said bolt for defining the upper motion limit of said clamp base.

2. The clamping apparatus according to claim 1, wherein said bolt is provided with means for indicating the tightening torque with which the clamp piece pressure the object of clamping.

3. The clamping apparatus according to claim 2, wherein said bolt has an axially extending blind hole, and said indicating means includes a rod with a top head inserted in the blind hole of the bolt, a rubber ring disposed between the rod and an opening portion of the blind hole, a transparent member disposed over the top head of the rod so as to face the same and closing the blind hole, a transparent pouch disposed between the transparent member and the top head of the rod, and a light absorbing fluid contained in the transparent pouch.

* * * * *

UNITED STATES PATENT AND TRADEMARK OFFICE
CERTIFICATE OF CORRECTION

PATENT NO. : 4,898,370

DATED : February 6, 1990

INVENTOR(S) : Masayuki Saito and Yasuo Kazama

It is certified that error appears in the above-identified patent and that said Letters Patent is hereby corrected as shown below:

On the title page:

Under the foreign application priority data on the cover sheet of the patent, the Japanese patent application 62-188683 should read "62-188683 [U]."

Signed and Sealed this

Twenty-sixth Day of March, 1991

*Attest:*

HARRY F. MANBECK, JR.

*Attesting Officer*     *Commissioner of Patents and Trademarks*